(12) United States Patent
McAlinden et al.

(10) Patent No.: US 8,556,214 B2
(45) Date of Patent: Oct. 15, 2013

(54) CROSS-BLEED DAM

(75) Inventors: Jon McAlinden, Bristol (GB); Eric Wildman, Bristol (GB)

(73) Assignee: Airbus Operations Limited, Bristol (GB)

( * ) Notice: Subject to any disclaimer, the term of this patent is extended or adjusted under 35 U.S.C. 154(b) by 453 days.

(21) Appl. No.: 12/821,517

(22) Filed: Jun. 23, 2010

(65) Prior Publication Data
US 2010/0327121 A1 Dec. 30, 2010

(30) Foreign Application Priority Data

Jun. 25, 2009 (GB) .................................. 0911012.3

(51) Int. Cl.
*B64C 3/50* (2006.01)
*F16J 15/16* (2006.01)

(52) U.S. Cl.
USPC ............................. 244/130; 244/215; 277/644

(58) Field of Classification Search
USPC ............. 244/211–217, 87, 90 R, 90 A, 99.14, 244/130, 131; 296/178, 180.1; 277/644
See application file for complete search history.

(56) References Cited

U.S. PATENT DOCUMENTS

| | | | | |
|---|---|---|---|---|
| 3,478,987 A * | 11/1969 | Dorand | ......................... | 244/212 |
| 4,120,470 A * | 10/1978 | Whitener | ....................... | 244/213 |
| 4,230,295 A | 10/1980 | Eppler | | |
| 4,479,620 A | 10/1984 | Rogers et al. | | |
| 4,669,687 A * | 6/1987 | Rudolph | ....................... | 244/215 |
| 4,717,097 A * | 1/1988 | Sepstrup | ........................ | 244/217 |
| 4,962,902 A | 10/1990 | Fortes | | |
| 5,224,670 A * | 7/1993 | Padden | ........................ | 244/123.3 |
| 5,253,828 A * | 10/1993 | Cox | ............................ | 244/200.1 |
| 5,388,788 A * | 2/1995 | Rudolph | ........................ | 244/215 |
| 5,735,485 A * | 4/1998 | Ciprian et al. | ................. | 244/113 |
| 7,611,099 B2 | 11/2009 | Kordel et al. | | |
| 7,669,800 B2 * | 3/2010 | Martin Hernandez | ........ | 244/130 |
| 7,815,147 B2 * | 10/2010 | Martin Hernandez | ........ | 244/130 |
| 2005/0011994 A1* | 1/2005 | Sakurai et al. | ................. | 244/212 |
| 2010/0288887 A1* | 11/2010 | Parker | ........................... | 244/213 |

FOREIGN PATENT DOCUMENTS

EP 2266877 A2 * 12/2010
GB 272231 A 11/1927

OTHER PUBLICATIONS

British Search Report for GB0911012.3 dated Oct. 6, 2009

* cited by examiner

*Primary Examiner* — Joseph W Sanderson
(74) *Attorney, Agent, or Firm* — Lowe Hauptman & Ham, LLP

(57) ABSTRACT

A panel assembly for an aircraft including a panel having an upper aerodynamic surface and a leading edge, and a hinge fitting connected to an underside of the panel, defining a hinge line for the direction of rotation of the panel. The upper surface of the leading edge has an arcuate portion centered about the hinge line, and has an upturned portion forward of the arcuate portion. The panel assembly is pivotally connected to its hinge fitting to the trailing edge of the fixed wing portion and rotatable between a first position wherein the upper surfaces of the fixed wing portion and the panel are substantially flush, and a second position wherein the panel is rotated downwardly from the first position. A seal member attached to the trailing edge of the fixed wing portion, has a lower surface which seals against the upper surface of the panel during its movement.

13 Claims, 7 Drawing Sheets

CROSS-BLEED DAM

RELATED APPLICATION

The present application is based on, and claims priority from, British Application Number 0911012.3, filed Jun. 25, 2009, the disclosure of which is hereby incorporated by reference herein in its entirety.

FIELD OF THE INVENTION

The present invention relates to a panel assembly for an aircraft. In particular, though not exclusively, the invention relates to a flight control device assembly.

BACKGROUND OF THE INVENTION

Aircraft have flight control devices on the leading and/or trailing edges of their aerofoil sections, such as the wings, horizontal tailplane, and vertical tailplane. Common leading or trailing edge devices are slats, flaps, spoilers, ailerons, elevators, rudders and air brakes. These flight control devices typically operate to provide enhanced lift or drag during low speed flight, for example take-off/climb and landing/descent, or to provide pitch, roll and yaw control during any of the flight phases.

When some of these flight control devices are deployed, a void is opened up in the upper and/or lower aerodynamic surfaces of the respective aerofoil section. It can be highly undesirable for an air path to be created between the lower and upper aerodynamic surfaces, as high pressure uplift air on the lower surface may leak through to the low pressure upper surface, which will impact upon the lift performance of the aerofoil. Also, voids created in the upper and lower surfaces cause surface discontinuities which leads to an increase in parasitic drag, noise etc. It is therefore desirable to seal these voids.

Aircraft wing trailing edge flaps are high lift devices which are typically deployed on take-off and landing to increase the lift coefficient by increasing the camber of the wing aerofoil. This is achieved by rotating the flap downwardly about its hinge line with respect to the main wing aerofoil portion. Some flaps, for example the Fowler flap, further increase the lift generated by the wing by also increasing the planform area of the wing. This is achieved by translating the flap aft as the flap is rotated downwardly. A "drop hinge flap" is a further type of flap which translates downwardly with respect to the main wing aerofoil portion as it rotates downwardly, when deployed.

Spoilers are flight control devices which are typically rotated upwardly from the aircraft wing trailing edge into the airflow to spoil the airflow and hence reduce the lift generated by the wing aerofoil. Spoilers are typically mounted spanwise between the main wing aerofoil portion and some of the flaps. The spoilers, when not deployed upwardly, provide a continuous upper surface of the wing between the main aerofoil portion and the flaps. However, spoilers are generally not provided across as much of the wing span as the flaps and so panels are provided spanwise between the main aerofoil portion and the flaps in regions not occupied by spoilers.

The drop hinge flap creates an effective slot between the trailing edge of the spoiler and the leading edge of the flap when deployed. This slot can further enhance the lift performance of the drop hinge flap. However, if this slot is too large and the continuity of the upper aerodynamic surface is not maintained, then the performance of the drop hinge flap is not as good as the Fowler flap. To control the size of the slot, the spoilers and the panels between the main aerofoil portion and the flaps are rotated downwardly or "drooped" when the drop hinge flaps are deployed.

On conventional, non-drooping spoilers, a seal is typically provided to sit beneath the leading edge of the spoiler. FIG. 7 shows a conventional spoiler seal 100 fastened to a wing trailing edge upper cover 200, and which contacts a leading edge of a spoiler 300. When the spoiler 300 is deployed upwardly, the spoiler will lift away from the seal 100 in the direction of arrow D. It is generally not necessary to seal the spoiler when it is deployed upwardly. When the spoiler 300 is in its neutral, i.e. not deployed position, as shown in FIG. 7, it is highly desirable to prevent cross-bleed air from passing from the lower wing surface, due to e.g. flap deployment, to the upper wing surface between the wing trailing edge upper cover 200 and the spoiler 300. By providing the seal 100 beneath the leading edge of the spoiler, the high pressure air from the lower surface will force the seal tight against the leading edge of the spoiler preventing cross-bleed. Panels disposed spanwise between non-drooping spoilers are generally fixed as they are required to neither droop nor be deployed upwardly into the airflow. The sealing of such panels is therefore trivial.

For drooping spoilers and drooping panels, the sealing at the spoiler or panel leading edge becomes more difficult. Not only does it become necessary for the panels to be sealed as well as the spoilers, but the seal 100 shown in FIG. 7 cannot be used as it would become damaged as the spoiler/panel droops. A seal instead has to be provided to seal against the upper (rather than lower) surface of the spoiler or panel. However, there is nothing for the seal to act against to prevent the high pressure air pushing through to the upper surface. This can cause the seal to flutter and a cross-bleed of air from the lower to the upper surface of the wing can occur.

This problem is not restricted to drooping spoiler/panel assemblies and could be found in any aircraft flight control device that is not part of a closed "box", i.e. it is (temporarily) exposed to airflow from beneath and is only sealed from above. By contrast, most ailerons have two seals, one on the upper and one on the lower surface at the aileron leading edge, to form a closed "box", such that no void is created when the aileron is deployed upwardly or downwardly from its neutral position.

SUMMARY OF THE INVENTION

A first aspect of the invention provides a panel assembly for an aircraft, the assembly comprising a panel having an upper aerodynamic surface and a leading edge, and a hinge fitting connected to an underside of the panel and which defines a hinge line about which the panel is adapted to rotate, wherein the leading edge of the panel is profiled such that its upper surface has an arcuate portion centred about the hinge line, and has an upturned portion forward of the arcuate portion.

A further aspect of the invention provides an aircraft wing assembly comprising a fixed wing portion having an upper aerodynamic surface and a trailing edge; a panel assembly according to the first aspect pivotally connected by its hinge fitting to the trailing edge of the fixed wing portion and rotatable between a first position in which the upper aerodynamic surfaces of the fixed wing portion and the panel are substantially flush, and a second position in which the panel is rotated downwardly with respect to the first position; and a seal member attached to the trailing edge of the fixed wing portion, the seal member having a lower surface which seals against the upper surface of the panel as the panel moves between the first and second positions, wherein the upturned portion of the panel acts as an air dam to protect the seal member when the panel is in the second position.

The present invention is advantageous in that the upturned portion of the panel is operable to protect the seal member when it is exposed to uplift air. This occurs when a gap or void is created in the lower aerodynamic surface of the wing due to, for example, deployment of trailing edge flaps during high-lift flight phases, which coincides with the movement of the panel assembly to its second, "drooped" position. The leading edge panel profile prevents or significantly reduces any flutter and cross bleed that would otherwise have a detrimental effect on the aircraft performance. The profile can be shaped to suit the particular size and shape of the seal it is protecting.

Preferably, the panel assembly is a flight control device assembly, such as a drooping spoiler assembly or a drooping panel assembly.

The seal member may include a blade portion which can sit flush against the upper aerodynamic surface at the leading edge of the panel. The blade portion may be generally wedge-shaped, with its taper in the downstream direction. A tip of the blade portion can be positioned to contact the arcuate portion of the panel, as it moves between the first and second positions.

The seal member may further include a bulb portion forward of the blade portion. The bulb portion may be positioned on the underside of the seal member to provide a second point of contact with the leading edge of the panel, to improve the effectiveness of the seal. When the panel is in the first position, the bulb portion may be positioned to contact the arcuate portion of the panel. When the panel is in the second position, the bulb portion may contact the point of inflection between the arcuate and upturned portions of the panel. In this way, the bulb portion is cupped by the profile of the panel leading edge, so protecting the seal, when the panel assembly is in the second position. Preferably, the upturned portion of the panel is profiled to substantially correspond to a profile of the lower surface of the seal member to enhance the seal protection.

The panel assembly may be rotatable to a third position in which the panel is rotated upwardly with respect to the first position. Where the panel assembly is a drooping panel assembly there will be no need for it to be rotatable upwardly. However, where the panel assembly is a drooping spoiler assembly it will need to be capable of being rotated upwardly into the airflow over the wing. Although it is not generally necessary for spoilers to be sealed when deployed into the airflow, in some circumstances it may be desirable to seal the panel when in the third position. Since the seal member seals against the upper aerodynamic surface of the panel, rotation of the panel upwardly can cause the seal member to be deflected upwardly such that the panel remains sealed to the fixed wing portion even when the panel is in the third position.

The aircraft wing assembly may further comprise a trailing edge flap pivotally connected to the fixed wing portion. The panel may be disposed between the fixed wing portion and the trailing edge flap. The trailing edge flap may be moveable between a retracted position and an extended position. The panel is in the first position when the flap is in the retracted position, and is in the second position when the flap is in the extended position. A gap may be opened up in a lower aerodynamic surface of the wing assembly when the flap is moved to the extended position.

BRIEF DESCRIPTION OF THE DRAWINGS

Embodiments of the invention will now be described with reference to the accompanying drawings, in which.

DETAILED DESCRIPTION OF EMBODIMENTS

Figure 1:
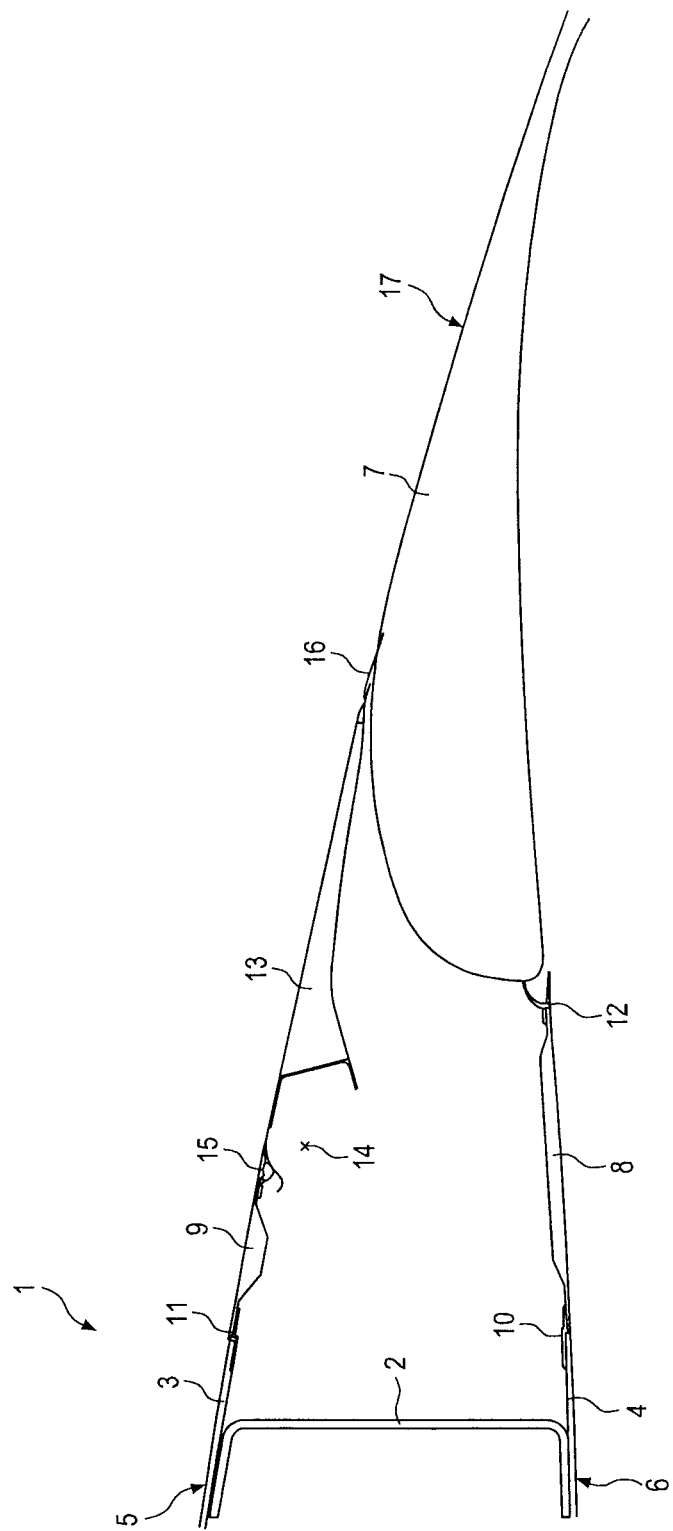
FIG. 1 illustrates a cross section through an aircraft wing trailing edge showing a flap and a spoiler both in their retracted positions.

FIG. 1 shows a cross section through an aircraft wing trailing edge. The wing includes a fixed wing portion 1 comprising a rear spar 2, an upper wing cover 3 and a lower wing cover 4. Outer surfaces of the upper and lower wing covers 3, 4 form upper and lower aerodynamic surfaces 5, 6, respectively.

A trailing edge drop hinge flap 7 is mounted to the fixed wing portion 1 by a drop hinge mechanism (not shown). A lower trailing edge panel 8 and an upper trailing edge panel 9 form part of the overall wing profile and may be removed to access the drop hinge flap mechanism. The lower trailing edge panel 8 is connected to the lower wing cover 4 by a butt-strap 10, and the upper trailing edge panel 9 is connected to the upper wing cover 3 by a butt-strap 11. A seal member 12 seals between the lower trailing edge panel 8 and the flap 7 when the flap is in its retracted position as shown in FIG. 1.

A drooping spoiler 13 is pivotally connected to the fixed wing portion 1 and is rotatable about a hinge line 14. A seal member 15 seals between the upper trailing edge panel 9 and the spoiler 13. The spoiler 13 includes a flexible trailing edge member 16 which seals against an upper aerodynamic surface 17 of the flap 7 when the flap is in its retracted position.

Figure 2:
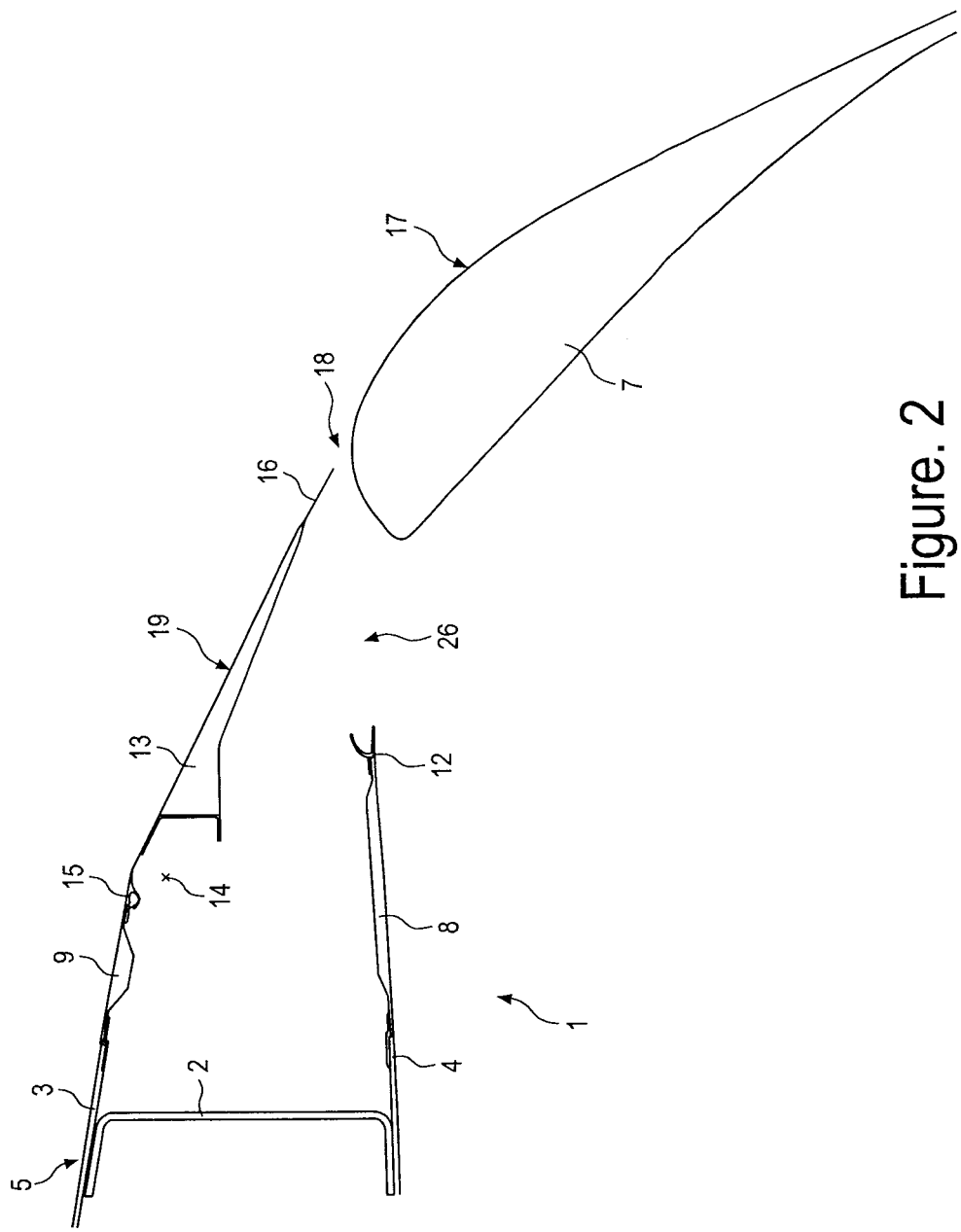
FIG. 2 illustrates the wing trailing edge showing the flap deployed and the spoiler in its drooped position.

As shown in FIG. 2, the flap 7 is moveable to a deployed position in which the flap 7 is translated aft of the fixed wing portion 1 and rotated downwardly by the drop hinge mechanism (not shown). When the flap 7 is in its deployed position, a slot 18 is opened up between the trailing edge of the spoiler 13 and the leading edge of the flap 7. The size of the slot 18 and the continuity of the upper aerodynamic surface of the wing trailing edge is controlled by rotating the drooping spoiler 13 downwardly about its hinge line 14 to a drooped spoiler position when the flap 7 is deployed. The spoiler 13 has an upper aerodynamic surface 19 which, as shown in FIG. 2, is oriented to smoothly transition between the upper aerodynamic surface 5 of the upper trailing edge panel 3 and the upper aerodynamic surface 17 of the flap 7.

Figure 3:
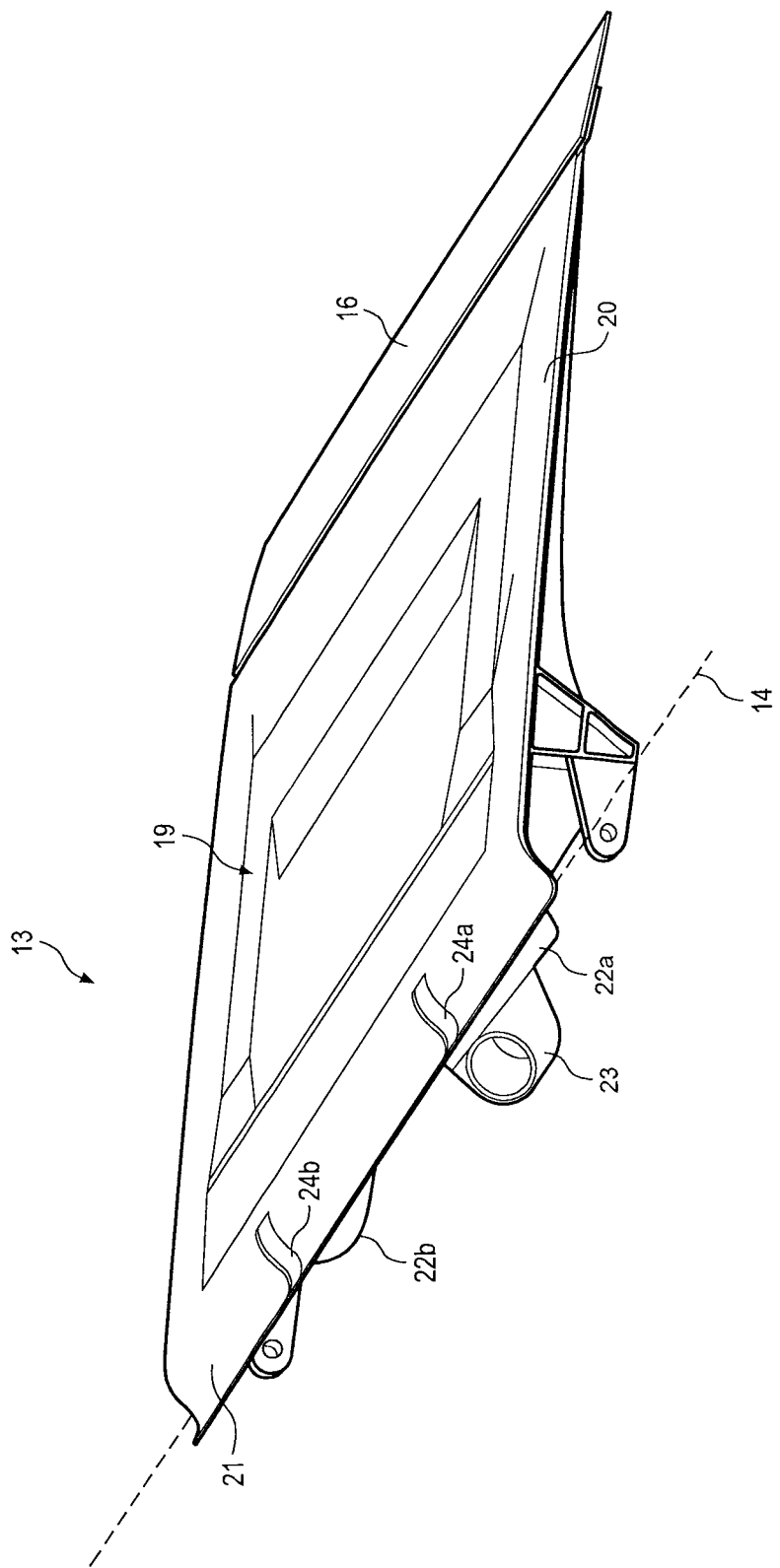
FIG. 3 illustrates a three-dimensional view of the spoiler having a profiled leading edge.

FIG. 3 shows the drooping spoiler 13 in detail. The spoiler 13 comprises a panel 20 having an upper aerodynamic surface 19 and a profiled leading edge 21. The flexible trailing edge member 16 is attached to the trailing edge of the panel 20. A two part hinge fitting 22a, 22b is connected to an underside of the panel 20. The hinge fitting 22a, 22b includes attachment lugs defining the hinge line 14 about which the panel 20 is adapted to rotate.

An actuation clevis 23 is also connected to the underside of the panel 20 which is connectable via a pin to an actuator (not shown) for controlling movement of the spoiler 13 about the hinge line 14 between the retracted and drooped positions. The spoiler 13 is also rotatable upwardly about its hinge line 14 under control of the actuator (not shown) to a deployed position in a conventional manner. When the spoiler 13 is rotated upwardly to its deployed position the leading edge profile 21 of the spoiler 13 dives beneath the upper aerodynamic surface of the fixed wing portion 1. To prevent conflict between the spoiler leading edge 21 and the spoiler hinge fitting (not shown) on the side of the fixed wing portion 1, when the spoiler 13 is in the deployed position, the leading edge 21 includes cut outs 24a, 24b. The cut outs 24a, 24b receive the hinge fitting on the side of the fixed wing portion 1 when the spoiler is deployed.

Figure 4:
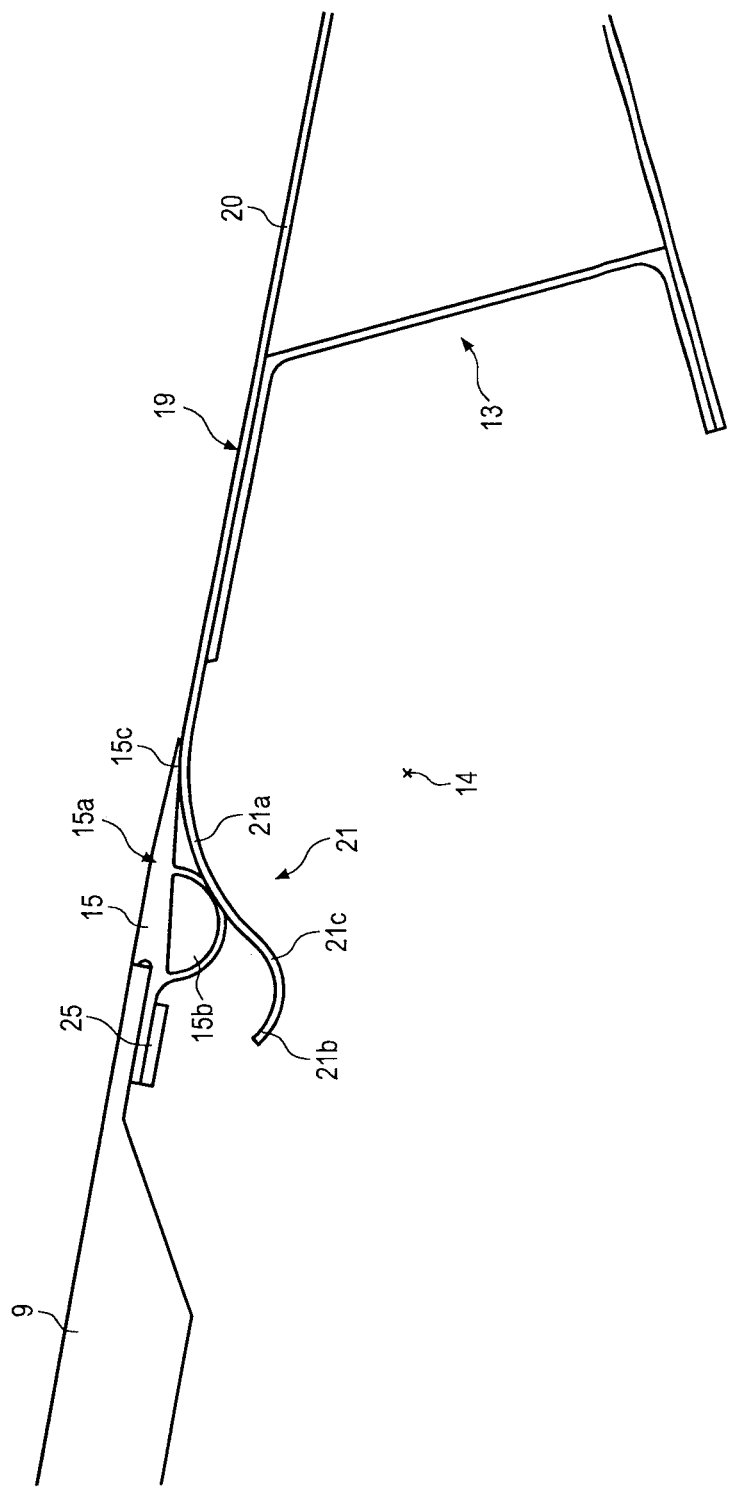
FIG. 4 illustrates a detailed cross section view of the spoiler leading edge and its seal with the spoiler in its retracted position.

FIG. 4 shows a detailed cross section view of the spoiler leading edge profile 21 and the spoiler seal member 15 when the spoiler 13 is in its retracted position. The seal member 15 includes a blade portion 15a and a bulb portion 15b forward of the blade portion 15a. The seal member 15 is attached to the upper trailing edge panel 9 by suitable fixing means 25. The blade portion 15a is generally wedge shaped, with its taper in the aerodynamic downstream direction. A tip 15c of the blade portion contacts the upper surface of the spoiler leading edge. The spoiler leading edge is shaped such that the contact point between the tip 15c of the seal member and the spoiler occurs at the intersection between the upstream end of the substantially planar panel 20 and the leading edge profile 21.

The leading edge profile 21 includes an arcuate portion 21a centred about the hinge line 14 and an upturned portion 21b forward of the arcuate portion 21a. There is a point of inflection 21c between the arcuate portion 21a and the upturned portion 21b. The bulb portion 15b of the seal member provides a second point of contact with the leading edge profile 21 to improve the effectiveness of the seal. When the spoiler 13 is in its retracted position, as shown in FIG. 4, the bulb portion 15b contacts the arcuate portion 21a of the leading edge profile. However, it will be appreciated that, as shown in FIG. 1, when the spoiler 13 is retracted the flap 7 is also retracted and sealed against the lower trailing edge panel 8 by the seal member 12, and so the sealing requirements of the seal member 15 to prevent cross bleed air flowing from the lower to the upper wing surface are low.

Figure 5:
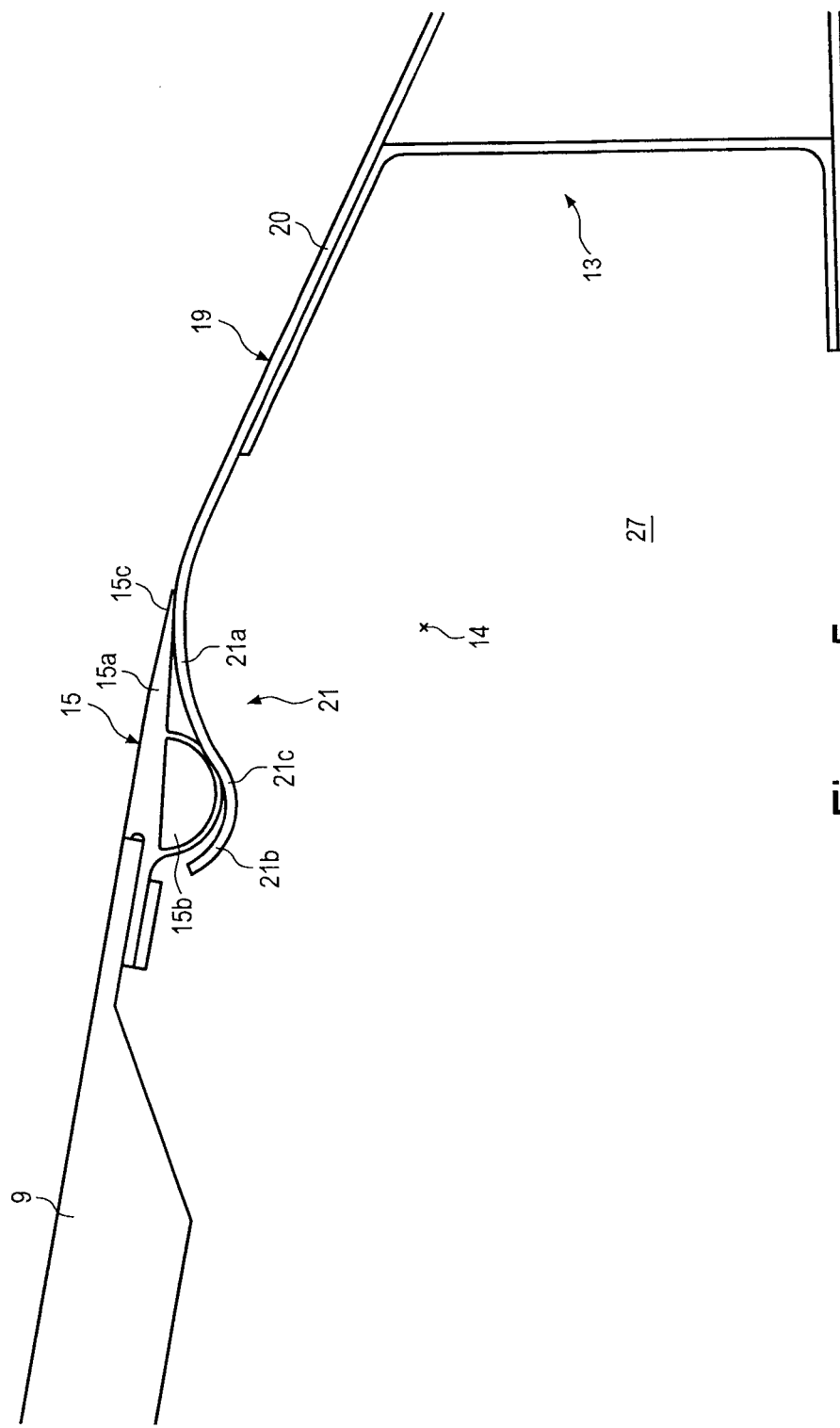
FIG. 5 illustrates a detailed cross section view of the spoiler and seal with the spoiler in its drooped position.

FIG. 5 shows the leading edge of the spoiler 13 and the spoiler seal member 15 with the spoiler 13 in its drooped position. The spoiler 13 is moved to the drooped position when the flap 7 is deployed so opening up a gap or void 26 in the lower aerodynamic surface of the wing, as shown in FIG. 2. With the flap 7 deployed, the spoiler seal member 15 has its tip 15c in contact with the arcuate portion 21a of the spoiler leading edge profile so as to seal between the upper trailing edge panel 9 and the spoiler 13. The drooping spoiler 13 typically droops downwardly by approximately 15° with respect to its retracted position.

The upturned portion 21b of the leading edge profile 21 acts to protect the underside of the seal member 15 when the spoiler is in the drooped position by forming an air dam against uplift air entering a cavity 27 in the wing trailing edge. The cavity 27 exists due to the space around the flap and spoiler actuation mechanisms (not shown), and uplift air enters this cavity through the gap 26 in the lower aerodynamic surface when the flap 7 is deployed. The upturned portion 21b of the leading edge profile 21 therefore prevents or significantly reduces any flutter of the seal member 15 and any cross bleed of air from the lower surface to the upper surface of the wing trailing edge which would otherwise have a detrimental effect on the aircraft performance.

The bulb portion 15b of the seal member 15 provides a second point of contact with the spoiler leading edge profile 21 at the point of inflection 21c. The leading edge profile 21 is shaped so as to approximately correspond to the lower surface of the seal member 15 so as to effectively "cup" the bulb portion 15b. This cupping effect also aids to prevent uplift air in the cavity 27 which has entered through the gap 26 from leaking through the seal member 15 to the upper wing surface.

Figure 6:
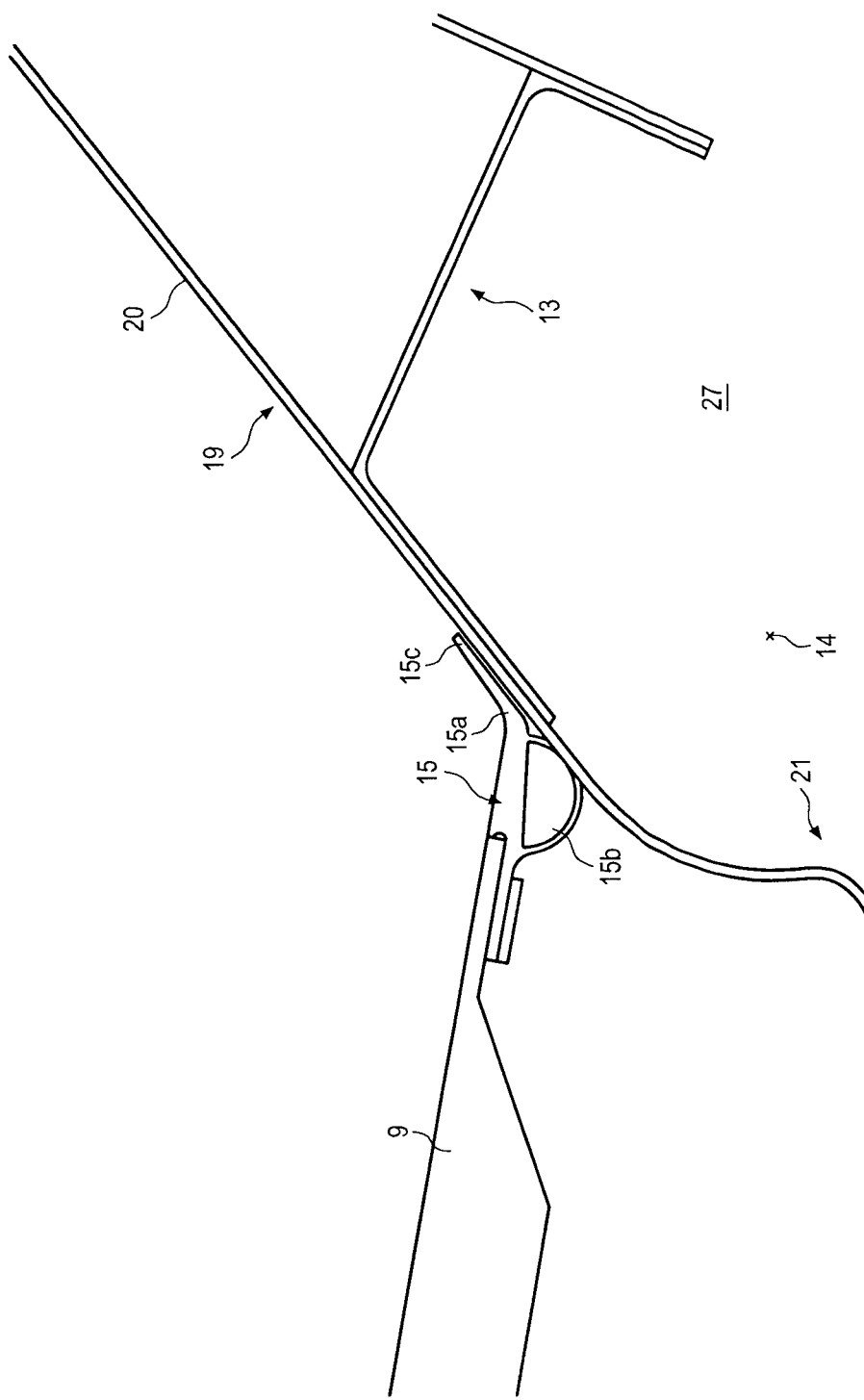
FIG. 6 illustrates a detailed cross section view of the spoiler and seal with the spoiler in its deployed position.

FIG. 6 shows the seal member 15 and the spoiler leading edge profile 21 with the spoiler 13 in its deployed position. In the deployed position, the spoiler is rotated upwardly at approximately 55 degrees with respect to the spoiler retracted position. In the deployed position, as shown in FIG. 6, the leading edge profile 21 is below the upper aerodynamic wing surface and the cut outs 24a, 24b (see FIG. 3) receive the spoiler hinge fittings (not shown) of the fixed wing portion 1.

Rotation of the spoiler 13 about the hinge line 14 to the spoiler deployed position causes the blade portion 15a of the seal member 15 to be deflected upwardly, as shown in FIG. 6. The blade portion 15a and the bulb portion 15b of the seal member provide two points of contact with the substantially planar upper surface 19 of the spoiler 13.

Whilst the invention has been described above in relation to a drooping spoiler, it is to be understood that this invention is equally applicable to a drooping panel. Typically, a greater spanwise proportion of an aircraft wing trailing edge is occupied by flaps than is occupied by spoilers. Where a drop hinge flap is provided at non-spoiler locations, a drooping panel is provided between a wing upper trailing edge panel and the drop hinge flap.

Figure 7:
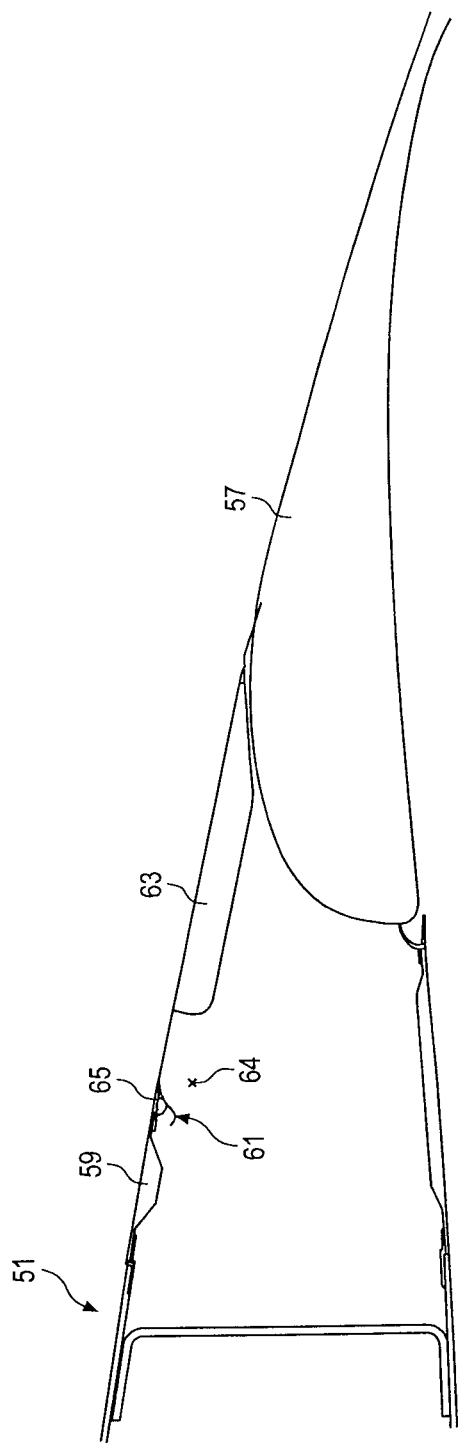
FIG. 7 illustrates a cross section through an aircraft wing trailing edge showing a flap and a droop panel both in their retracted positions.
Figure 8:
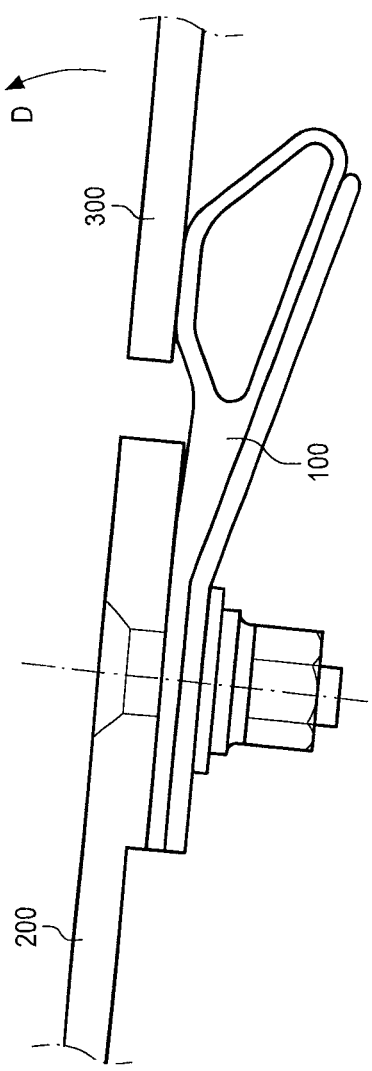
FIG. 8 illustrates a prior art non-drooping spoiler seal arrangement.

FIG. 7 illustrates a cross section through an aircraft wing trailing edge having a drooping panel 63. The drooping panel 63 may be disposed adjacent the drooping spoiler 13 described above on the same aircraft. The drooping panel 63 is pivotally connected to a fixed wing portion 51 by a hinge mechanism (not shown) which defines a hinge line 64 about which the drooping panel rotates between neutral (retracted) and drooped positions. The drooping panel 63 is disposed between an upper trailing edge panel 59 of the fixed wing portion 51 and a drop hinge flap 57 (similar to the flap 17). A seal member 65 (similar to the seal member 15) seals between the upper trailing edge panel 59 and the drooping panel 63.

The drooping panel 63 differs from the drooping spoiler 13 in that the drooping panel 63 is not rotatable upwardly into the airflow over the upper wing surface. Also, the drooping panel 63 does not have a dedicated actuator, and instead its motion is controlled by a mechanical linkage (not shown) between the flap 57 and the droop panel 63. As the flap 57 is moved between its retracted and deployed positions, the linkage mechanism causes slave movement of the drooping panel 63 between its retracted and drooped positions, respectively.

The leading edge profile 61 and the seal member 65 are virtually identical to the leading edge profile 21 and the seal member 15 described previously, with the exception that the profile 61 has no cut outs since the drooping panel 63 is not rotatable upwardly. The leading edge profile 61 cooperates with the seal member 65 in a virtually identical way to the cooperation between the profile 21 and seal 15 described previously, so as to form an air dam to protect the seal member 65. This prevents or significantly reduces any flutter and cross bleed that would otherwise have a detrimental effect on the aircraft performance.

Whilst in the specific embodiments described above, the seal members have a bulb portion, other seal member shapes are envisaged within the scope of the present invention. For example, the bulb portion may be replaced by a "J-shaped" protrusion extending from the lower surface of the blade portion of the seal member. The J-shape protrusion may provide an improved sealing action at the second point of contact between the seal member and the upper surface of the drooping spoiler/panel assembly. The flow of uplift air in the cavity 27 may be trapped by the J-shaped protrusion so forcing the J-shaped protrusion into secure sealing contact with the leading edge profile of the drooping spoiler/panel assembly.

Although the invention has been described above with reference to one or more preferred embodiments, it will be appreciated that various changes or modifications may be made without departing from the scope of the invention as defined in the appended claims.

The invention claimed is:

1. A panel assembly for an aircraft, comprising:
   a panel having an upper aerodynamic surface and a leading edge,
   a hinge fitting connected to an underside of the panel and which defines a hinge line about which the panel is adapted to rotate,
   wherein the leading edge of the panel is profiled such that an upper surface of said leading edge has an arcuate portion centred about the hinge line,
   wherein said leading edge of the panel has an upturned portion forward of the arcuate portion, and
   wherein the arcuate portion and the upturned portion together form an inflection in the upper surface of the leading edge of the panel.

2. A panel assembly according to claim 1, wherein the panel assembly is a drooping spoiler assembly or a drooping panel assembly.

3. A panel assembly according to claim 1, wherein the panel assembly is a flight control device assembly.

4. An aircraft wing assembly comprising:
   a fixed wing portion having an upper aerodynamic surface and a trailing edge;
   a panel assembly comprising
      a panel having an upper aerodynamic surface and a leading edge,
      a hinge fitting connected to an underside of the panel and which defines a hinge line about which the panel is adapted to rotate,
      wherein the leading edge of the panel is profiled such that an upper surface of said leading edge has an arcuate portion centred about the hinge line, and
      wherein said leading edge of the panel has an upturned portion forward of the arcuate portion,
   said panel assembly pivotally connected by said hinge fitting to the trailing edge of the fixed wing portion and rotatable between a first position in which the upper aerodynamic surfaces of the fixed wing portion and the panel are substantially flush, and a second position in which the panel is rotated downwardly with respect to the first position; and
   a seal member attached to the trailing edge of the fixed wing portion, the seal member having a lower surface which seals against the upper surface of the panel as the panel moves between the first and second positions,
   wherein the upturned portion of the panel acts as an air dam to protect the seal member when the panel is in the second position.

5. An aircraft wing assembly according to claim 4, wherein the seal member includes a blade portion.

6. An aircraft wing assembly according to claim 5, wherein the seal member further includes a bulb portion forward of the blade portion.

7. An aircraft wing assembly according to claim 6, wherein bulb portion seals against the upper surface of the panel.

8. An aircraft wing assembly according to claim 4, wherein the upturned portion of the panel is profiled to substantially correspond to a profile of the lower surface of the seal member.

9. An aircraft wing assembly according to claim 4, wherein the panel assembly is rotatable to a third position in which the panel is rotated upwardly with respect to the first position.

10. An aircraft wing assembly according to claim 9, wherein the seal member is deflected upwardly and said lower surface seals against the upper aerodynamic surface of the panel when the panel is in the third position.

11. An aircraft wing assembly according to claim 4, further comprising a trailing edge flap pivotally connected to the fixed wing portion, wherein the panel is disposed between the fixed wing portion and the trailing edge flap.

12. An aircraft wing assembly according to claim 11, wherein the trailing edge flap is moveable between a retracted position and an extended position, and wherein the panel is in the first position when the flap is in the retracted position, and is in the second position when the flap is in the extended position.

13. An aircraft wing assembly according to claim 12, wherein a gap is opened up in a lower aerodynamic surface of the wing assembly when the flap is moved to the extended position.

* * * * *